United States Patent
Gonzalez et al.

(10) Patent No.: US 11,956,290 B2
(45) Date of Patent: Apr. 9, 2024

(54) MULTI-MEDIA COLLABORATION CURSOR/ANNOTATION CONTROL

(71) Applicant: Avaya Inc., Santa Clara, CA (US)

(72) Inventors: Ignacio Miranda Gonzalez, Madrid (ES); Bryan Solan, Galway (IE)

(73) Assignee: Avaya Inc., Santa Clara, CA (US)

( * ) Notice: Subject to any disclaimer, the term of this patent is extended or adjusted under 35 U.S.C. 154(b) by 876 days.

(21) Appl. No.: 14/638,960

(22) Filed: Mar. 4, 2015

(65) Prior Publication Data
US 2016/0259522 A1    Sep. 8, 2016

(51) Int. Cl.
| | |
|---|---|
| G06F 3/16 | (2006.01) |
| G06F 3/0481 | (2022.01) |
| G06F 40/169 | (2020.01) |
| H04L 65/1089 | (2022.01) |
| H04L 65/401 | (2022.01) |

(Continued)

(52) U.S. Cl.
CPC ........ H04L 65/4038 (2013.01); G06F 3/0481 (2013.01); G06F 3/167 (2013.01); G06F 40/169 (2020.01); H04L 65/1089 (2013.01); H04L 65/4015 (2013.01); H04L 65/403 (2013.01)

(58) Field of Classification Search
CPC ... H04L 65/403; H04L 65/00; H04L 65/4038; H04L 65/1089; H04L 65/4015; G06F 17/30011; G06F 3/167; G06F 3/048; G06F 40/00; G06F 3/0481; G06F 40/169; H04M 11/007; G06T 11/00
See application file for complete search history.

(56) References Cited

U.S. PATENT DOCUMENTS 5,583,980 A * 12/1996 Anderson ......... G06F 17/30017
345/473
5,920,694 A * 7/1999 Carleton ............... G06F 3/0481
348/E7.083

(Continued)

OTHER PUBLICATIONS

"Screenhero: Better than working in the same room," Sep. 27, 2014, retrieved from https://web.archive.org/web/20140927025147/https://screenhero.com/, 9 pages.

(Continued)

*Primary Examiner* — Jennifer N Welch
*Assistant Examiner* — Kuang F Chen
(74) *Attorney, Agent, or Firm* — Sheridan Ross P.C.

(57) ABSTRACT

When a multimedia conference between multiple users at multiple locations is established, a first cursor controlled by a first user in a first location is provided. A first event associated with the multimedia conference is detected. In response to detecting the first event associated with the multimedia conference, control of cursors in the multimedia conference can be handled in various ways to enhance the multimedia conference. For example, control of the first cursor can be switched from the first user to a second user at a second location, a second cursor can be provided to the multimedia conference that is controlled by the second user, or control of the first cursor can be merged so that the first cursor can be controlled by both the first user and the second user. This allows for enhanced control of the cursor in the multimedia conference that more closely resembles an in-person conference.

18 Claims, 5 Drawing Sheets

(51) Int. Cl.
*H04L 65/403* (2022.01)
*H04L 65/4038* (2022.01)

(56) References Cited

U.S. PATENT DOCUMENTS

| | | | | |
|---|---|---|---|---|
| 7,954,049 B2* | 5/2011 | Fletcher | | G06F 17/241 707/608 |
| 8,843,816 B2* | 9/2014 | Stull | | G06Q 10/10 715/200 |
| 9,092,533 B1* | 7/2015 | Demathieu | | G06F 17/30873 |
| 2002/0109728 A1* | 8/2002 | Tiongson | | G06F 3/04855 715/786 |
| 2006/0181608 A1* | 8/2006 | Knappe | | H04M 3/564 348/14.09 |
| 2007/0005752 A1* | 1/2007 | Chawla | | H04L 12/1831 709/224 |
| 2007/0100952 A1* | 5/2007 | Chen | | H04L 12/1831 709/207 |
| 2007/0123243 A1* | 5/2007 | Suito | | H04M 11/007 455/419 |
| 2008/0040137 A1* | 2/2008 | Lee | | G06Q 10/10 705/309 |
| 2008/0096597 A1* | 4/2008 | Vempati | | H04W 4/10 455/518 |
| 2008/0103906 A1* | 5/2008 | Singh | | G06Q 30/0269 705/14.64 |
| 2009/0210228 A1* | 8/2009 | George | | H04M 3/4936 704/251 |
| 2009/0210789 A1* | 8/2009 | Thakkar | | H04L 65/403 715/719 |
| 2009/0292999 A1* | 11/2009 | LaBine | | G06F 3/1454 715/740 |
| 2010/0191799 A1* | 7/2010 | Fiedorowicz | | G06F 17/30873 709/203 |
| 2010/0199191 A1* | 8/2010 | Takahashi | | G06F 3/0481 715/741 |
| 2010/0251177 A1* | 9/2010 | Geppert | | H04L 65/403 709/206 |
| 2010/0253689 A1* | 10/2010 | Dinicola | | H04N 7/147 345/467 |
| 2012/0020641 A1* | 1/2012 | Sakaniwa | | G11B 27/105 386/230 |
| 2012/0204118 A1* | 8/2012 | Lefar | | G06F 3/04883 715/756 |
| 2012/0226997 A1* | 9/2012 | Pang | | H04L 65/4038 715/753 |
| 2012/0296914 A1* | 11/2012 | Romanov | | G11B 27/034 707/E17.101 |
| 2013/0022189 A1* | 1/2013 | Ganong, III | | G10L 15/00 379/202.01 |
| 2013/0086155 A1* | 4/2013 | Thomas | | H04L 67/01 709/203 |
| 2013/0198657 A1* | 8/2013 | Jones | | H04L 67/36 715/758 |
| 2013/0249788 A1* | 9/2013 | Mitsui | | G06F 3/167 345/156 |
| 2014/0059569 A1* | 2/2014 | Hasegawa | | G06F 9/54 719/320 |
| 2015/0058723 A1* | 2/2015 | Cieplinski | | G06F 3/04855 715/702 |
| 2015/0149404 A1* | 5/2015 | Lock | | H04L 65/403 707/608 |
| 2015/0162000 A1* | 6/2015 | Di Censo | | G10L 15/22 704/270.1 |
| 2016/0057390 A1* | 2/2016 | Ramalho | | H04N 7/155 348/14.08 |
| 2016/0065625 A1* | 3/2016 | Ouyang | | H04L 65/403 715/753 |

OTHER PUBLICATIONS

"Bomgar: Use Annotations to Enhance Screen Sharing," Sep. 21, 2014, retrieved from https://web.archive.org/web/20140921052500/http://www.bomgar.com/products/features/annotations, 8 pages.

* cited by examiner

MULTI-MEDIA COLLABORATION CURSOR/ANNOTATION CONTROL

TECHNICAL FIELD

The systems and methods disclosed herein relate to multimedia systems and in particular to control systems for multimedia communications.

BACKGROUND

In face-to-face communications, people naturally and instinctively use not only voice, but also use gestures and movements, such as, pointing to direct a listener's focus while speaking. For example, each person involved in a face-to-face communication may use their hand or a laser pointer to draw attention to documents or diagrams being discussed during a presentation.

In multimedia conferences, the mouse pointer and annotations are the instinctive virtual equivalents of the laser pointer and a whiteboard marker. However, in current systems, only the presenter's cursor is visible to other users and only the presenter can control the cursor or annotate a document in the presentation. The remaining participants in the multimedia communication currently do not have the ability to be involved in the same manner as in a face-to-face communication.

SUMMARY

Systems and methods are provided to solve these and other problems and disadvantages of the prior art. When a multimedia conference between multiple users at multiple locations is established, a first cursor controlled by a first user in a first location is provided. A first event associated with the multimedia conference is detected. For example, a user (e.g., the first user or a user other than the first user) may issue a command via a menu in the multimedia conference to control the cursor. In response to detecting the first event associated with the multimedia conference, control of one or more cursors in the multimedia conference can be handled in various ways to enhance the multimedia conference. For example, control of the first cursor can be switched from the first user to a second user at a second location (which may or may not be the same as the first location), a second cursor can be provided to the multimedia conference that is controlled by the second user, or control of the first cursor can be merged so that the first cursor can be controlled by both the first user and the second user. These options allow for enhanced control of the cursor in the multimedia conference that more closely resembles an in-person meeting.

DETAILED DESCRIPTION

Figure 1:
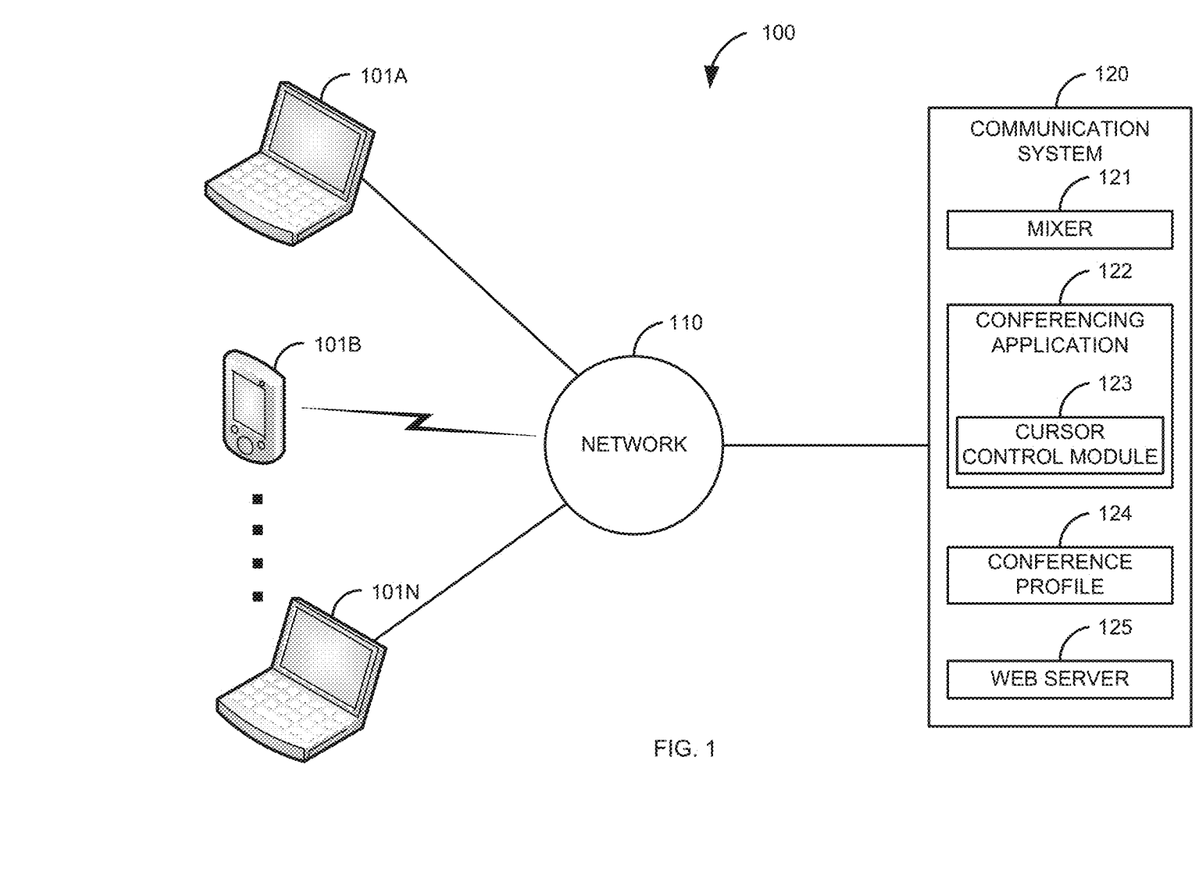
FIG. 1 is a block diagram of a first illustrative system for controlling a cursor in a multimedia conference.

FIG. 1 is a block diagram of a first illustrative system 100 for controlling a cursor in a multimedia conference. The first illustrative system 100 comprises communication endpoints 101A-101N, a network 110, and a communication system 120.

The communication endpoints 101A-101N can be or may include any device that can communicate on the network 110 and is an endpoint in a communication session, such as, a Personal Computer (PC), a telephone, a video phone, a cellular telephone, a Personal Digital Assistant (PDA), a tablet device, a notebook device, and/or the like. As shown in FIG. 1, any number of communication endpoints 101A-101N may be connected to the network 110. In addition, one or more of the communication endpoints 101A-101N may be directly connected to the communication system 120. The communication endpoints 101A-101N are typically at different locations. For example, the communication endpoint 101A can be located in Denver, the communication endpoint 101B can be located in New Jersey, and the communication endpoint 101N can be located in Spain. A communication endpoint 101 may have a single user associated therewith or multiple users associated therewith. The latter type of communication endpoint 101 may also be referred to as a shared endpoint due to the fact that multiple users share input and/or output devices of the communication endpoint 101.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a video network, a multimedia network, a combination of these, and the like. The network 110 can use a variety of electronic protocols, such as Ethernet, Internet Protocol (IP), Session Initiation Protocol (SIP), Integrated Services Digital Network (ISDN), video protocols, Extended Markup Language (XML) Hyper Text Markup Language (HTML) Requests, web sockets, Real Time Protocol (RTP), web protocols, and/or the like. Thus, the network 110 is an electronic communication network that allows for sending of messages via packets and/or circuit switched communications.

In one embodiment, the network 110 comprises the PSTN (or other voice network) and a data network, such as the Internet, corporate network, and/or LAN. The PSTN is used for the audio portion of a multimedia conference. The Internet/corporate network/LAN is used for the multimedia portion of the multimedia conference. For example, a user may call via a telephone for the audio portion using the PSTN. The user then may use their PC for the multimedia portion/cursor control via the Internet or corporate network by accessing a web URL.

The communication system 120 can be or may include any hardware/software that can establish and control a multimedia conference, such as a Private Branch Exchange (PBX), a communication manager, a video switch, a session manager, and/or the like. The communication system 120 further comprises a mixer 121, a conferencing application 122, a conference profile 124, and a web server 125. The communication system 120 can include custom hardware that can be used in management and control of the multimedia conference. For example, the communication system 120 may comprise a field programmable gate array or application specific processor, such as a digital signaling processor.

The mixer 121 can be or may include any hardware/software that can mix voice, video, multimedia, and/or text communications. For example, the mixer 121 may mix audio signals/streams or video signals/streams for a discussion in a multimedia conference between users of the communication endpoints 101A-101N. In FIG. 1, the mixer 121 is shown as part of the communication system 120. However, in another embodiment, the mixer 121 may be distributed between the communication system 120 and the communication endpoints 101A-101N.

The conferencing application 122 can be any software/hardware that can manage a multimedia conference between the communication endpoints 101A-101N. A multimedia conference is a conference that provides multimedia (e.g., display of documents) to two or more users. The conferencing application 122 is shown as part of the communication system 120. However, in another embodiment, the conferencing application 122 may be distributed between the communication system 120 and the communication endpoints 101A-101N.

The conferencing application 122 also comprises a cursor control module 123. The cursor control module 123 can be or may include any hardware/software that can control a cursor in a multimedia conference or enable various users to control the cursor in the multimedia conference.

The conference profile 124 can be any file or set of information that contains information for controlling aspects of a multimedia conference, such as an American Standard Code for Information Exchange (ASCII) file, an Extensible Markup Language (XML) file, a text file, a binary file, and/or the like. The conference profile 124 can include user preferences and/or administrator preferences on how to control one or more cursors in a multimedia conference.

The web server 125 can be or may any include hardware/software that can provide web services for the multimedia conference, such as an Apache™ web server, a Nginx™ web server, and Microsoft-IIS™ web server, and/or the like. The web server 125 can use a variety of protocols, such as XML HTTP Requests, web sockets, Java Server pages, and/or the like.

The above descriptions are where the mixer 121, the conferencing application 122, the cursor control module 123, the conference profile 124, and the web server 125 are part of a centralized communication system 120. However, in another embodiment, these elements 121-125 may be in one or more of the communication endpoints 101A-101N. For example, in a peer-to-peer environment that does not have a centralized communication system 120.

Figure 2:
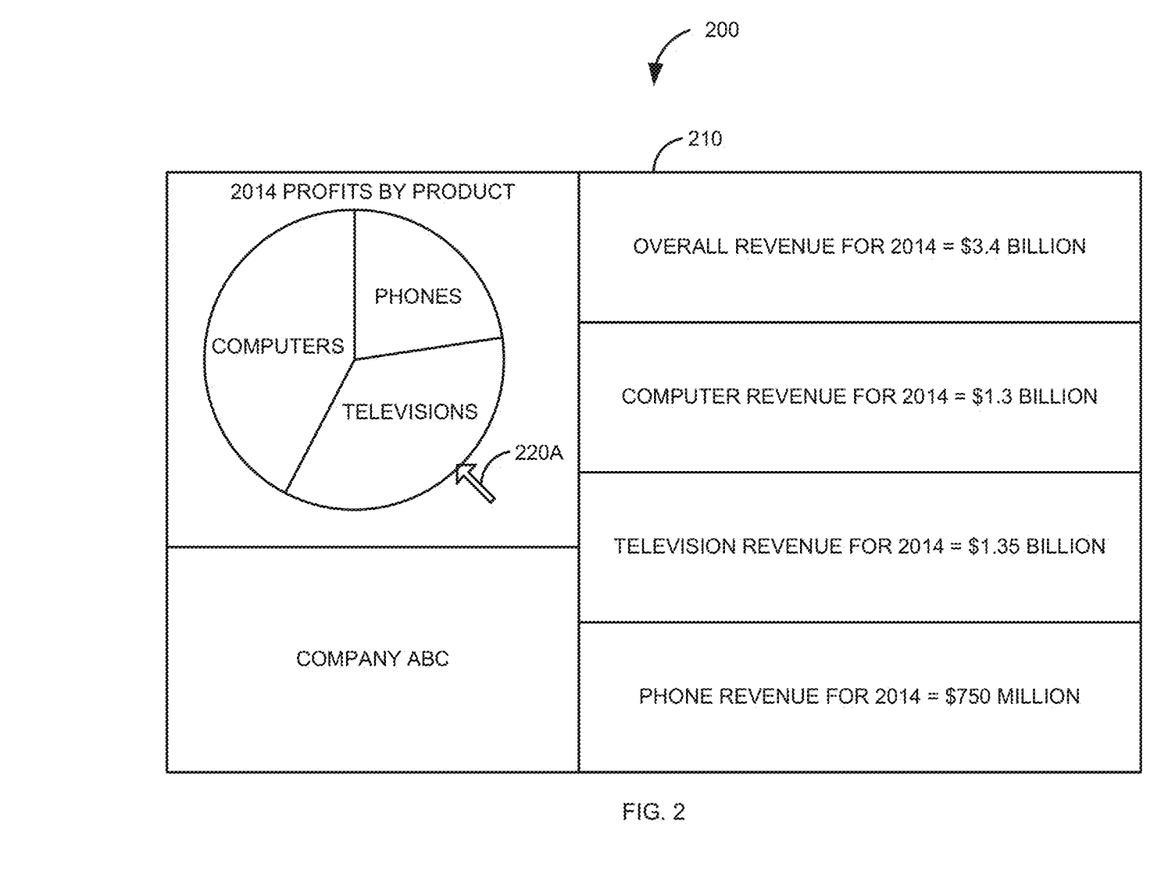
FIG. 2 is a diagram of a first view of a multimedia conference that uses a single cursor.

FIG. 2 is a diagram of a first view 200 of a multimedia conference that uses a single cursor 220A. The first view 200 is a first example of a document 210 being displayed as part of a multimedia conference. In this example, the document 210 is an individual slide in a presentation, which is an overview of revenue for the company ABC in 2014. The first view 200 includes a single cursor 220A. The single cursor 220A is shown as an arrow shaped movable icon. In this embodiment, movement of the single cursor 220A can be controlled by two or more users of the communication endpoints 101A-101N who are in the multimedia conference. For example, a first user at the communication endpoint 101A can control the single cursor 220A for a first period of time in the multimedia conference. Based on a defined event, such as a second user starting to speak, the second user at the communication endpoint 101B can control the single cursor 220A for a second period of time (that follows or coincides with the first period of time) in the multimedia conference.

The displayed icon for the single cursor 220A may change during the multimedia conference. For example, if the single cursor 220A can only be controlled by one user at a time, the single cursor 220A may also include a name (not shown) for the user currently controlling the single cursor 220A (similar to the cursors 220B and 220C in FIG. 3). Alternatively, when the first user controls the single cursor 220A, the single cursor 220A looks as shown with the arrow icon. When the second user controls the single cursor 220A, the shape of the single cursor 220A can change to a different shaped icon, such as a diamond shaped icon or the arrow may change from an upward pointing arrow to a downward pointing arrow.

In another embodiment, a second icon of the single cursor 220A may be displayed when two users can control the single cursor 220A at the same time. For example, the single cursor 220A's icon may change to a square or a two-headed arrow when two users can control the single cursor 220A at the same time. When a first user moves the single cursor 220A, the first user's name may be displayed by the square single cursor 220A. When the second user moves the single cursor 220A, the second user's name may be displayed by the square single cursor 220A.

Figure 3:
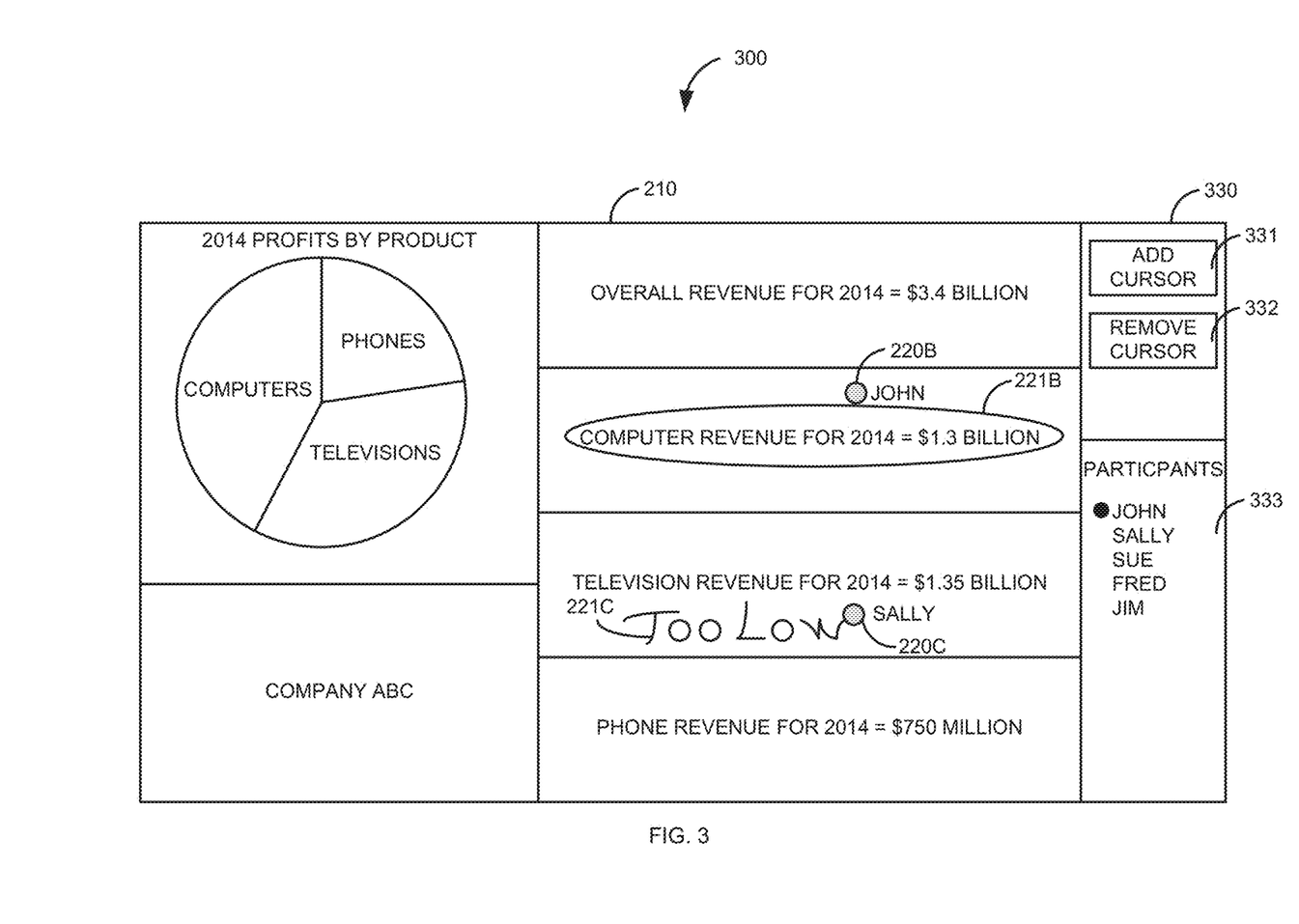
FIG. 3 is a diagram of a second view of a multimedia conference that uses two or more cursors.

FIG. 3 is a diagram of a second view of a multimedia conference that uses two or more cursors 220. The second view 300 is a second example of the document 210 being displayed as part of the multimedia conference. In this embodiment, two cursors 220B and 220C are provided as part of the multimedia conference. Both of the cursors 220A, 220B, and/or 220C may correspond to annotators. An annotator is a cursor 220 can allows a user to annotate a view of the multimedia conference 200/300. In FIG. 3, the cursors 220B and 220C have a circle for an icon.

In addition, the second view 300 includes a multimedia conference control section 330. The multimedia conference control section 330 includes an add cursor button 331, a remove cursor button 332, and a conference participants section 333. The conference participants section 333 shows each of the participants in the multimedia conference. The multimedia conference has the participants John, Sally, Sue, Fred, and Jim. The black dot by John indicates that John is the currently speaking participant.

The add cursor button 331 allows an individual user to add a cursor 220. The remove cursor button 332 allows the individual user to remove a cursor 220. For example, if the second view 300 was for the user John at the communication endpoint 101A, John could add a cursor 220 that he controls by clicking the add cursor button 331. John could remove the cursor 220 that he controls by clicking on the remove cursor button 332.

The adding and removing of a cursor 220 may be accomplished in various ways in addition to using the add cursor button 331 and the remove cursor button 332. For example, a user or moderator could select a user name in the conference participants section 333 and drag the user name onto the document 210 to add a cursor 220 for control by the selected user. Alternatively, a user could select a menu to add and/or remove a cursor 220 for an individual user.

In one embodiment, a moderator of the multimedia conference may control the cursors 220 for each participant in the multimedia conference. For example, if the moderator was John, John can add and/or remove cursors 220 for Sally, Sue, Fred, and/or Jim to use in the multimedia conference.

In FIG. 3, the cursor 220B is controlled by John (as indicated by John's name by the cursor 220B). John has annotated the item "COMPUTER REVENUE FOR 2014=$1.3 BILLION" in the document 210 as indicated by annotation 221B. The cursor 220C is controlled by Sally (as indicated by Sally's name by the cursor 220C). Sally has drawn an annotation 221C for the item "TELEVISION REVENUE FOR 2014=$1.35 BILLION" that states that this is "Too Low." Although FIG. 3 only shows two cursors 220B and 220C, additional cursors 220 may be presented and controlled by other users in the multimedia conference.

The icon for the cursors 220B and 220C may be displayed differently depending on implementation. For example, the icon for the cursor 220B may be different from the icon 220C based on defined user preferences.

In addition, the functionality of the cursors 220B and 220C may be different. For example, the cursor 220B may always be controlled by a single user (John), while the cursor 220C may be controlled by multiple users. The cursor 220C may be controlled by the user Sally during the first ten slides of a presentation and then controlled by a third user Fred for the last ten slides of the presentation. The control of the cursor 220B and 220C may be defined in the conference profile 124 or administered at the start of the multimedia conference.

Figure 4:
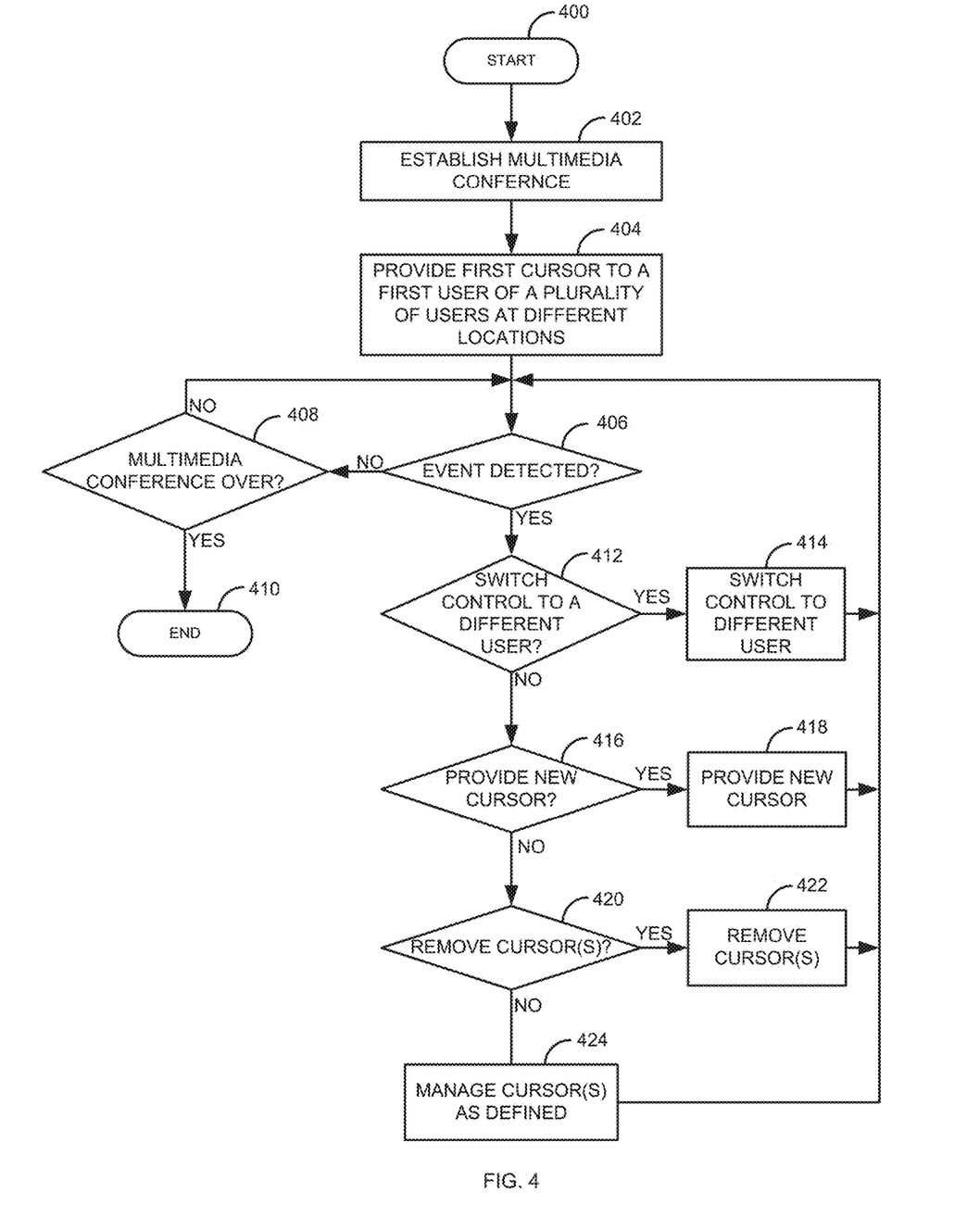
FIG. 4 is a flow diagram of a process for controlling a cursor in a multimedia conference.
Figure 5:
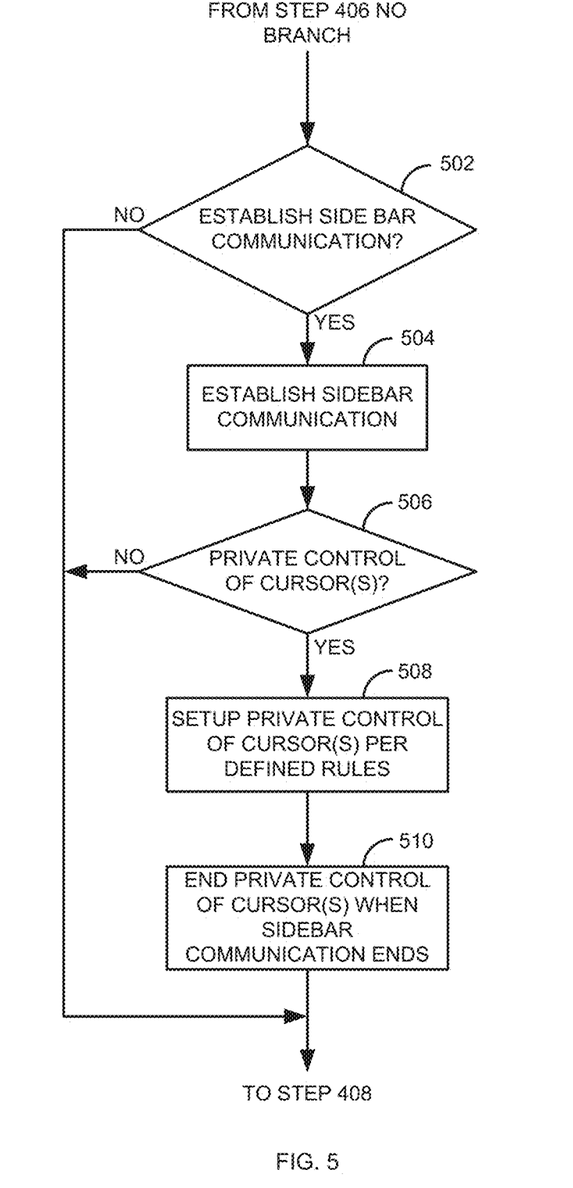
FIG. 5 is a flow diagram of privately controlling a cursor in a multimedia conference based on a sidebar communication.

FIG. 4 is a flow diagram of a process for controlling one or multiple cursors 220 in a multimedia conference. Illustratively, the communication endpoints 101A-101N, the communication system 120, the mixer 121, the conferencing application 122, the cursor control module 123, and the web server 125 are stored-program-controlled entities, such as a computer or processor, which performs the method of FIGS. 4-5 and the processes described herein by executing program instructions stored in a tangible computer readable storage medium, such as a memory or disk. Although the methods described in FIGS. 4-5 are shown in a specific order, one of skill in the art would recognize that the steps in FIGS. 4-5 may be implemented in different orders and/or be implemented in a multi-threaded environment. Moreover, various steps may be omitted or added based on implementation.

The process starts in step 400. The mixer 121 establishes voice, video, and/or text portion of the multimedia conference between the communication endpoints 101A-101N in step 402. The multimedia portion of conference is established by the conferencing application 122. The process of establishing the voice/video/text and multimedia can occur at the same time or separately. For example, the communication endpoints 101A-101N can all go to a Universal Resource Identifier (URI) provided by the web server 125 to be connected to the multimedia conference (for both audio/video and multimedia). Alternatively, the communication endpoints 101A-101N can make a voice call to a conferencing telephone number to have the mixer 121 establish a voice conference. The users, via the URI served by the web server 125 can then receive the multimedia portion of the conference via the web server 125.

The cursor control module 123 provides a first cursor 220 in the multimedia conference controlled by a first user at the communication endpoint 101A in step 404 (e.g., as shown in FIG. 2). The conferencing application 122 determines in step 406 if an event was detected. An event may correspond to one or a series of actions or occurrences associated with the multimedia conference. The event may include one or more events that are defined in the conference profile 124. For example, the event can be based on detection of who is currently speaking in the multimedia conference. When a new user speaks in the multimedia conference, the conferencing application 122 will detect the event (via the mixer 121) in step 406.

The conferencing application 122 can detect who is currently speaking in various ways. For instance, the conferencing application 122 can analyze voice data received via Real Time Protocol (RTP) or via the Public Switched Telephone Network (PSTN) from a user to determine if the user is speaking over a defined threshold.

The conference profile 124 may contain individual user profiles. The individual user profiles can be defined by individual users. For example, a user may be able to define different communication endpoints 101 that will be used during the multimedia conference, such as a PC being used for the multimedia portion/mouse control and a telephone being used for the voice portion of the multimedia conference. The conferencing application 122 can detect the user's voice level (e.g., via the PSTN) to provide cursor 220 control on a separate communication device (e.g., the user's PC) connected via a different network, such as the Internet.

A period of time may be associated with an event. For example, the event may be to switch the cursor 220 to the currently speaking user. However, the cursor 220 may not switch for a defined number of seconds after a user speaks before switching control of the cursor 220 to a new user.

The event can be that a user is speaking a defined percentage of time in the multimedia conference. For example, if the user at the communication endpoint 101B is speaking 30% of the time in the multimedia conference, the user of communication endpoint 101B will be provided a second cursor 220 (e.g., was shown in FIG. 3).

The event can be based on who is speaking the most in a defined period. For example, if John as spoken the most over the last five minutes, then John will control the cursor 220. The event can be based on amplitude. For instance, the loudest (or quietest person) may control the cursor 220.

The event may be a voice command spoken by a user in the multimedia conference. For example, the user at the communication endpoint 101B can say "add cursor" or "remove cursor" to have a second cursor 220 added or removed from the multimedia conference.

The event may be a user entering one or more Dual Tone Multi-Frequency (DTMF) tones during the multimedia conference. For example, the user may enter *9 to add a cursor 220 controlled by the user to the multimedia conference or *8 to remove a cursor 220.

In one embodiment, the event may be based on an agenda for the multimedia conference. For example, the agenda may be for a slide presentation in the multimedia conference. Alternatively, the agenda may define a lecture period where only the moderator controls a first cursor 220 and group discussion of where the group can control the first cursor 220 and/or a second cursor 220.

Other events may include a gesture, such as a user raising their hand or shaking their head. The event may be that the user is looking at a specific area of a presented document, the user pointing to the specific area of the presented document 210, a stress level or mood of the user, the presence of the user being on camera (e.g., being in view of the user's camera), a command from the user, a sound level of the user (e.g., how loudly or softly the user is speaking, and/or the like.

Other examples of events that can control a cursor 220 can include a user walking out of a conference room or office, the user walking away from the multimedia conference, the user not paying attention to the multimedia conference, and/or the like.

In one embodiment, the event may be based on monitoring brain activity of a user, such as a user with disabilities. Based on detection of the brain activity of the user, a cursor 220 can be added into the multimedia conference. All the above events can be associated with switching control of a cursor 220, adding a cursor 220, merging control of a cursor 220, and/or removing a cursor 220.

If a defined event is not detected in step 406, the process goes to step 408. The conferencing application 122 determines in step 408 if the multimedia conference is over (e.g., if the moderator ends the multimedia conference). If the multimedia conference is over in step 408, the process ends in step 410. Otherwise, if the multimedia conference is not over in step 408, the process goes to step 406.

If an event is detected in step 406, the cursor module 123 determines if the event results in switching control of the cursor 220 to a different user. If the event results in switching control of the cursor 220 to the different user in step 412, the cursor control module 123 switches control of the cursor 220 to the different user in step 414. For example, the second user at the communication endpoint 101B may speak a voice command, select a button, select a menu, or enter one or more DTMF tones to switch control of the cursor 220 to the second user. The process then goes back to step 406 to check for another event.

If the event does not result in switching control of the cursor 220 to a different user in step 412, the cursor control module 123 determines if the event results in providing a new cursor 220 in step 416. If the event results in providing a new cursor 220 in step 416, the cursor control module 123 provides the new cursor 220 in step 418 and the process goes to step 406. The event that results in providing a new cursor 220 can be based on various criteria. For example, the cursor control module 123 can provide a new cursor 220 for a second user based on the second user speaking more loudly or becoming agitated.

If the event does not result in providing a new cursor 220 in step 416, the cursor control module 123 determines, in step 420, if the event results in removing one or more cursors 220. If the event does result in removing the one or more cursors 220, in step 420, the cursor control module 123 removes the one or more cursors 220 in step 422. For example, the multimedia conference may be in a group discussion mode where each user in the multimedia conference can control an individual cursor 220. Based on a command from the presenter, the cursor control module 123 can remove all the cursors 220 for the group in step 422 and only leave the cursor 220 of the moderator. The process then goes to step 406.

If the event does not result in removing the one or more cursors 220, the cursor control module 123 manages the cursor 220 as defined in step 424 and then goes to step 406. For example, the cursor control module 123 can merge control of inputs received from two cursors 220 into a single cursor 220. To merge control, the cursor control module 123 may remove a second cursor 220 controlled by a second user and make the first cursor 220 controllable by the first and second users at the same time. Alternatively, the cursor control module 123 can add a second user to control a single cursor 220. Other types of events may be to unmerge control of a curser 220 by presenting a new cursor 220 and changing control of the previously merged cursor 220.

Other events may be related to controlling the cursor 220 and/or managing usage of the cursor 220. For example, an event may be a command to erase all annotations associated with one or more cursors 220. For example, an individual user may send a command via DTMF or voice to erase all annotations made by the user. Alternatively, a moderator may send a command via DTMF or voice to erase all annotations made by all users in the multimedia conference. The event may result in highlighting a particular user's annotations or changing colors of annotations. Other events may be to change a cursor 220, a color of a cursor 220, and/or to animate a cursor 220. Still over events may be to record the annotations and/or cursor 220 movements as part of the multimedia conference. When the annotations and/or cursor 220 movements are recorded, information regarding who is controlling the cursor can also be captured and made available during playback of the multimedia conference.

The above descriptions describe the steps 412-424 as being implemented in series. However, in other embodiments, an event may results in two or more of the steps 414, 418, 422, and 424 being implemented based on a single event. For example, an event in an agenda (e.g., going to group discussion mode) may cause a first cursor 220 controlled by a first user (a presenter) to switch to a second user (a moderator) and also cause one or more additional cursors 220 (cursors for individuals in the group) to be provided in the multimedia conference.

FIG. 5 is a flow diagram of privately controlling a cursor 220 in a multimedia conference based on a sidebar communication. The process of FIG. 5 goes between steps 406 and 408 of FIG. 4. If an event is not detected in step 406, the conferencing application 122 checks, in step 502, if a request to establish a sidebar communication has been received. A sidebar communication can be a separate communication that occurs during the multimedia conference between two or more users that are involved in the multimedia conference. For instance, a user at the communication endpoint 101A may have an Instant Messaging sidebar communication session with a user at the communication endpoint 101B during a multimedia conference between the users at the communication endpoints 101A-101N. The sidebar communication may be a voice communication, a video communication, a text communication, and/or the like.

If a request to establish a sidebar communication is not received in step 502, the process goes to step 408. Otherwise, if a request to establish a sidebar communication has been received in step 502, the conferencing application 122 establishes the sidebar communication session in step 504. The conferencing application 122 determines in step 506 if a request to setup private control of the cursor(s) 220 has been received. A request to setup private control of the cursor(s) 220 can be any type of request, such as a DTMF tone(s), a voice command, a command from a graphical user interface, and/or the like. For example, a user, via a graphical user interface, may indicate to provide private control when establishing the sidebar communication. Private control of a cursor 220 can be for an individual user or two or more users to control one or more cursors 220 where at least one other participant in the conference cannot see the cursor(s) 220 and/or annotations associated with the cursor(s) 220.

If a request to setup private control of the cursor(s) 220 has not been received in step 506, the process goes to step 408. Otherwise, if a request to setup private control of the cursor(s) 220 has been received in step 506, the cursor control module 123 sets up private control of the cursor(s) 220 per defined rules (or user commands) in step 508. The rules can be stored in the conference profile 124. The rules can be based on a variety of conditions, such as, which users can see the cursor(s) 220 (i.e., only those in the sidebar communication), which users can annotate, if two or more users can control a single cursor 220, if each user has their own cursor 220, and/or the like.

The private control of the cursor 220 ends in step 510 when the sidebar communication ends. Step 510, in one embodiment, is a separate thread that is spun off and checks for the sidebar communication to end. Once the sidebar session ends in step 510, the process goes to step 408.

In one embodiment, the private control of the sidebar communication may end before the sidebar communication ends. For example, the private control may be terminated by a user, even though the sidebar communication is still ongoing.

In another embodiment, private control of one or more cursors 220 may exist while one or more other cursors 220 may not be under private control. For example, while one cursor is under private control, another cursor controlled by a different or the same user may be displayed to all users in the multimedia conference.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   providing, by a microprocessor, a first cursor in a multimedia conference, wherein the first cursor is shared by a plurality of users in the multimedia conference, wherein the multimedia conference comprises the plurality of users on a plurality of communication endpoints at a plurality of locations;
   recording, by the microprocessor, annotations and cursor movements as part of the multimedia conference, wherein information regarding who is controlling the first cursor is also captured and made available during playback of the multimedia conference, and wherein a color of the annotations and cursor movements is changed based on a user associated with the annotations and cursor movements; and
   detecting an event associated with a stress level or mood of a second user of the plurality of users speaking during the multimedia conference and in response to the detected event, determining whether the detected event results in switching control of the first cursor; and
   when the detected event results in switching control of the first cursor, switch control of the first cursor to the second user;
   when the detected event does not result in switching control of the first cursor, add a second cursor in the multimedia conference, wherein the second cursor is controlled by the second user.

2. The method of claim 1, further comprising:
   detecting a second event associated with the multimedia conference and in response to detecting the second event, further enabling at least one of:
   switching control of the first cursor in the multimedia conference to a different user;
   removing control of the first cursor in the multimedia conference from a user of the plurality of users; or
   adding an additional cursor in the multimedia conference.

3. The method of claim 1, further comprising associating a time period for a user speaking to control the first cursor in the multimedia conference after the user stops speaking.

4. The method of claim 1 further comprising:
   recording the multimedia conference, wherein the recording the multimedia conference comprises recording control of the first cursor in the multimedia conference and individual users associated with controlling the first cursor in the multimedia conference.

5. The method of claim 1, wherein an event associated with the multimedia conference further comprises detecting a group discussion period to switch control of the first cursor in the multimedia conference.

6. The method of claim 2, wherein the second event is at least one of:
   a user walking out of a conference room or office;
   the user walking away from the multimedia conference;
   the user not paying attention to the multimedia conference;
   the user looking at or pointing to a specific area of a presented document;
   one or more Dual Tone Multi-Frequency (DTMF) tones;
   a stress level or mood of the user; and
   presence of the user being off camera.

7. The method of claim 2, wherein the second event is at least one of:
   a controlling user walking out of a conference room or office; the controlling user walking away from the multimedia conference; and the controlling user not paying attention to the multimedia conference.

8. The method of claim 2, wherein the second event is a stress level or mood of a controlling user.

9. The method of claim 2, wherein the second event is a presence of a third user being off camera.

10. The method of claim 6, wherein the second event is the user not paying attention to the multimedia conference.

11. The method of claim 6, wherein the second event is a third user looking at or pointing to the specific area of the presented document.

12. The method of claim 6, wherein the second event is the presence of the user being off camera.

13. The method of claim 6, wherein the second event is the stress level or mood of the user.

14. A system comprising:
   a memory, a microprocessor in communication with the memory, the microprocessor executes software modules, the software modules comprising:
   a conferencing application that provides, a first cursor in a multimedia conference shared by a plurality of users in the multimedia conference, wherein the multimedia conference comprises the plurality of users on a plurality of communication endpoints at a plurality of locations;
   the conferencing application records annotations and cursor movements as part of the multimedia conference, wherein information regarding who is controlling the first cursor is also captured and made available during playback of the multimedia conference, and wherein a color of the annotations and cursor movements is changed based on a user associated with the annotations and cursor movements; and
   detecting an event associated with a stress level or mood of a second user of the plurality of users speaking during the multimedia conference and in response to the event, determining whether the detected event results in switching control of the first cursor and;
   when the detected event results in switching control of the first cursor, switch control of the first cursor to the second user;
   when the detected event does not result in switching control of the first cursor, add a second cursor in the multimedia conference, wherein the second cursor is controlled by the second user.

15. The system of claim 14, wherein:
the conferencing application detects a second event associated with the multimedia conference and in response to detecting the event, does at least one of:
switches control of the first cursor in the multimedia conference to a different user;
removes control of the first cursor in the multimedia conference from a user; or
adds an additional cursor in the multimedia conference.

16. The system of claim 14, wherein only displaying the first cursor in the multimedia conference on a first communication endpoint and on a second communication endpoint comprises:
a mixer that establishes a sidebar communication between the first communication endpoint and the second communication endpoint.

17. The system of claim 14, wherein a user is speaking in the multimedia conference, and wherein a time period for the speaking user to control the first cursor in the multimedia conference after the speaking user stops speaking is determined.

18. The system of claim 15, wherein the second event is at least one of:
a user walking out of a conference room or office;
the user walking away from the multimedia conference;
the user not paying attention to the multimedia conference;
the user looking at or pointing to a specific area of a presented document;
a stress level or mood of the user;
presence of the user being on camera;
one or more Dual Tone Multi-Frequency (DTMF) tones; and
presence of the user being off camera.

* * * * *

UNITED STATES PATENT AND TRADEMARK OFFICE
CERTIFICATE OF CORRECTION

PATENT NO. : 11,956,290 B2
APPLICATION NO. : 14/638960
DATED : April 9, 2024
INVENTOR(S) : Ignacio Miranda Gonzalez and Bryan Solan Page 1 of 1

It is certified that error appears in the above-identified patent and that said Letters Patent is hereby corrected as shown below:

In the Claims

At Column 9, Line 66, after "wherein" delete --the-- therein.

Signed and Sealed this
Seventeenth Day of December, 2024

Derrick Brent
*Acting Director of the United States Patent and Trademark Office*